(12) United States Patent
Waddell et al.

(10) Patent No.: US 10,590,916 B2
(45) Date of Patent: Mar. 17, 2020

(54) MULTISIPHON PASSIVE COOLING SYSTEM

(71) Applicant: General Electric Company, Schenectady, NY (US)

(72) Inventors: Alistair Martin Waddell, Munich (DE); Mark Aaron Chan, Munich (DE); Mikel Andonegi Aldaz, Barcelona (ES)

(73) Assignee: General Electric Company, Schenectady, NY (US)

( * ) Notice: Subject to any disclaimer, the term of this patent is extended or adjusted under 35 U.S.C. 154(b) by 67 days.

(21) Appl. No.: 15/876,438

(22) Filed: Jan. 22, 2018

(65) Prior Publication Data

US 2019/0226461 A1    Jul. 25, 2019

(51) Int. Cl.
*F03D 80/60* (2016.01)
*F03D 9/25* (2016.01)
*F25B 41/00* (2006.01)

(52) U.S. Cl.
CPC .............. *F03D 80/60* (2016.05); *F03D 9/25* (2016.05); *F25B 41/003* (2013.01); *F05B 2260/207* (2013.01); *F05B 2260/232* (2013.01)

(58) Field of Classification Search
CPC .......... F03D 80/60; F03D 9/25; F25B 41/003; F05B 2260/232; F05B 2260/207; H05K 7/20936
See application file for complete search history.

(56) References Cited

U.S. PATENT DOCUMENTS

| 7,168,251 B1* | 1/2007 | Janssen | F03D 80/60 60/641.1 |
| 2012/0148407 A1* | 6/2012 | Akashi | F03D 9/28 416/95 |
| 2012/0235419 A1 | 9/2012 | Huang et al. | |

(Continued)

FOREIGN PATENT DOCUMENTS

| CN | 101325118 A | 12/2008 |
| CN | 202483806 U | 10/2012 |

(Continued)

OTHER PUBLICATIONS

Extended European Search Report and Opinion issued in connection with corresponding EP Application No. 18382054.7 dated Aug. 2, 2018.

*Primary Examiner* — Ana M Vazquez
(74) *Attorney, Agent, or Firm* — Dority & Manning, P.A.

(57) ABSTRACT

A cooling system includes one or more heat generating components located within an enclosure. A first conduit is thermally connected to one or more of the heat generating components, and the first conduit is fluidly connected to a distribution manifold and a condensing unit. The condensing unit is located external to the enclosure and above the heat generating components. The distribuition manifold is located below the heat generating components. A second conduit is fluidly connected to the condensing unit and the distribution manifold. The cooling system includes a two-phase cooling medium. The first conduit, condensing unit, second conduit and distribution manifold form a loop in which the cooling medium circulates.

20 Claims, 5 Drawing Sheets

(56) References Cited

U.S. PATENT DOCUMENTS

| | | | |
|---|---|---|---|
| 2012/0240551 A1* | 9/2012 | Johnson | F02C 6/18 60/266 |
| 2012/0257970 A1* | 10/2012 | Akashi | F28D 1/022 416/95 |
| 2013/0202421 A1 | 8/2013 | Himmelmann | |
| 2016/0128231 A1 | 5/2016 | Wagoner et al. | |

FOREIGN PATENT DOCUMENTS

| | | |
|---|---|---|
| CN | 206309535 U | 7/2017 |
| WO | 2010/139597 A1 | 12/2010 |
| WO | 2016/116204 A1 | 7/2016 |

* cited by examiner

MULTISIPHON PASSIVE COOLING SYSTEM

BACKGROUND OF THE INVENTION

Embodiments of the present invention relate generally to a passive cooling system and more particularly to a multisiphon passive cooling system for a wind turbine.

Many known devices (e.g., generators, rectifiers, inverters and transformers) are used for conversion of electric power. Rectifiers are used for converting alternating current (AC) to direct current (DC) and inverters are used for converting DC current to AC current. Typically, rectifiers and inverters are integrated into full power conversion assemblies (i.e., power converters) used in renewable electric power generation facilities such as solar power generation farms and wind turbine farms. These devices typically generate large amounts of heat during power generation. At least some known power generating devices use a liquid cooling system for cooling the main heat generating components. These liquid cooling systems include an active pump for pumping a working liquid for cooling the power devices, and these systems may also include fans and valves. In such a system, maintaining a flow rate of the working liquid in two or more branches of the liquid cooling system may be problematic due to high resistance to a flow of the working liquid in some branches in comparison to low resistance to the flow of the working liquid in other branches.

A liquid cooling system employing pumps, fans and/or valves is classified as an active system. The term 'active' referring to the mechanical action performed by the pump to circulate the liquid cooling medium, or the forced airflow by the fan. All active systems require periodic maintenance, and this is critical for system reliability. For example, if a pump fails then the entire cooling system will fail to satisfactorily cool the heat generating components. This is especially problematic for off-shore wind turbines that have limited opportunities for access and maintenance.

BRIEF DESCRIPTION OF THE INVENTION

In accordance with one aspect, a cooling system includes one or more heat generating components located within an enclosure. A first conduit is thermally connected to one or more of the heat generating components, and the first conduit is fluidly connected to a distribution manifold and a condensing unit. The condensing unit is located external to the enclosure and above the heat generating components. The distribution manifold is located below the heat generating components. A second conduit is fluidly connected to the condensing unit and the distribution manifold. The cooling system includes a two-phase cooling medium. The first conduit, condensing unit, second conduit and distribution manifold form a loop in which the cooling medium circulates.

In accordance with another aspect, a cooling system includes one or more heat generating components located within an enclosure. A first conduit is thermally connected to one or more of the heat generating components. The first conduit is fluidly connected to a distribution manifold and a condensing unit. The condensing unit is located external to the enclosure and above the heat generating components, and the distribution manifold is located below the heat generating components. A second conduit is fluidly connected to the condensing unit and the distribution manifold. The cooling system is comprised of a two-phase cooling medium, and the first conduit, condensing unit, second conduit and distribution manifold form a loop in which the cooling medium circulates without the need of a pump or fan.

BRIEF DESCRIPTION OF THE DRAWINGS

These and other features and aspects of the disclosed invention will become better understood when the following detailed description is read with reference to the accompanying drawings in which like characters represent like parts throughout the drawings.

DETAILED DESCRIPTION OF THE INVENTION

Figure 1:
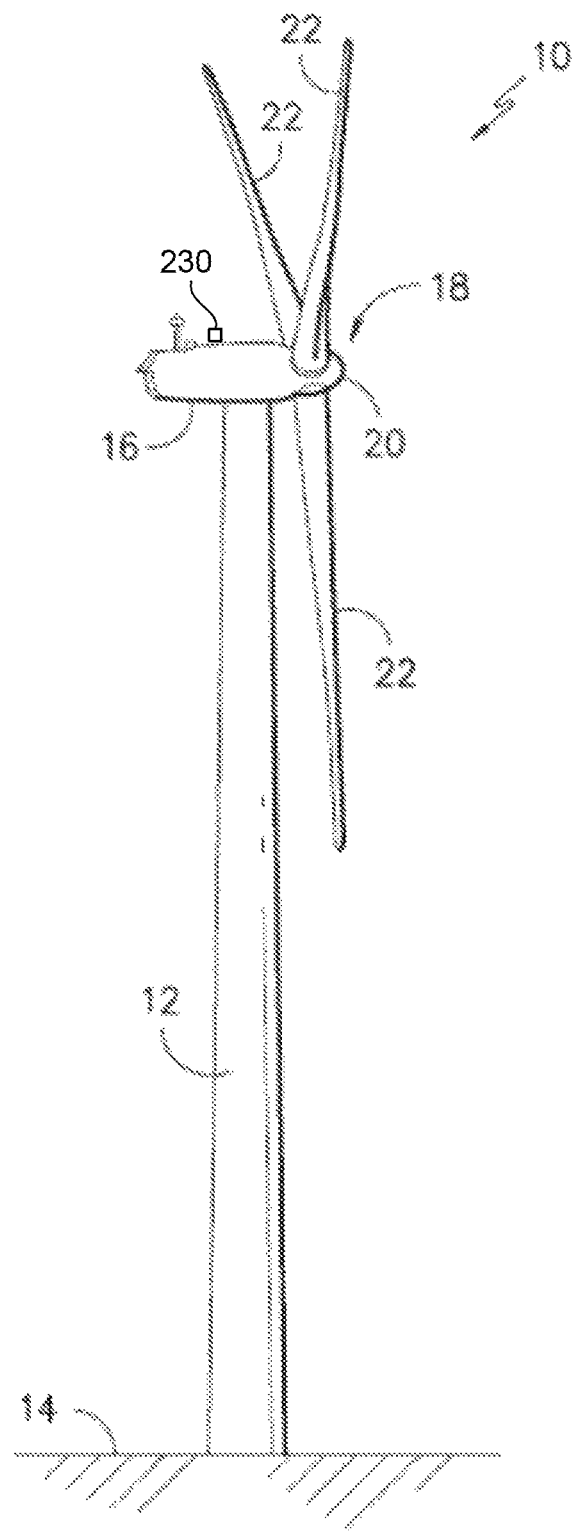
FIG. 1 illustrates a perspective view of one embodiment of a wind turbine, according to an aspect of this disclosure.

Reference now will be made in detail to aspects/embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one aspect/embodiment can be used with another aspect/embodiment to yield a still further aspect/embodiment. Thus, it is intended that the present invention covers such modifications and variations as come within the scope of the appended claims and their equivalents.

In general, the present subject matter is directed to a passive cooling system for the heat generating components in a wind turbine. The system is completely passive and does not require a pump or fan to circulate a cooling fluid. In this manner, the cooling system described herein is very reliable, requiring very little, if any, maintenance.

Aspects discussed herein disclose a cooling and heat dissipation system having a thermosiphon including one or more cooling loops, where each cooling loop includes at least one heat generating component. Such a cooling system may be used for thermal management of a power converter, transformer, gearbox or generator. Additionally, the cooling and heat dissipation system may be used for thermal management of a hermetically sealed motor (e.g., a pitch or yaw drive) or the like. The cooling system includes a first conduit, a condensing unit, a second conduit and a distribution manifold all connected into a loop. The condenser is disposed above the first and second conduits and heat generating components that are thermally connected to the first conduit. It should be noted herein that the term "above" as used herein means the condenser is physically located at a higher location with respect to the first conduit and heat generating components. The condensing unit is used to receive the two-phase fluid from the first conduit and/or a vapor spreader, and dissipate the extracted heat to an ambient atmosphere to produce a single-phase fluid. It should be noted herein that the term "single-phase fluid" refers to a liquid medium. Similarly, the term "two-phase fluid" may refer to a mixture of liquid and gaseous mediums, or a gaseous medium.

Referring now to the drawings, FIG. 1 illustrates a side view of a wind turbine 10. As shown, the wind turbine 10 generally includes a tower 12 extending from a support surface 14 (e.g., the ground, a concrete pad, offshore platform or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, the rotor 18 may include three rotor blades 22 (as shown). However, the rotor 18 may include more or less than three rotor blades 22. Each rotor blade 22 is spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
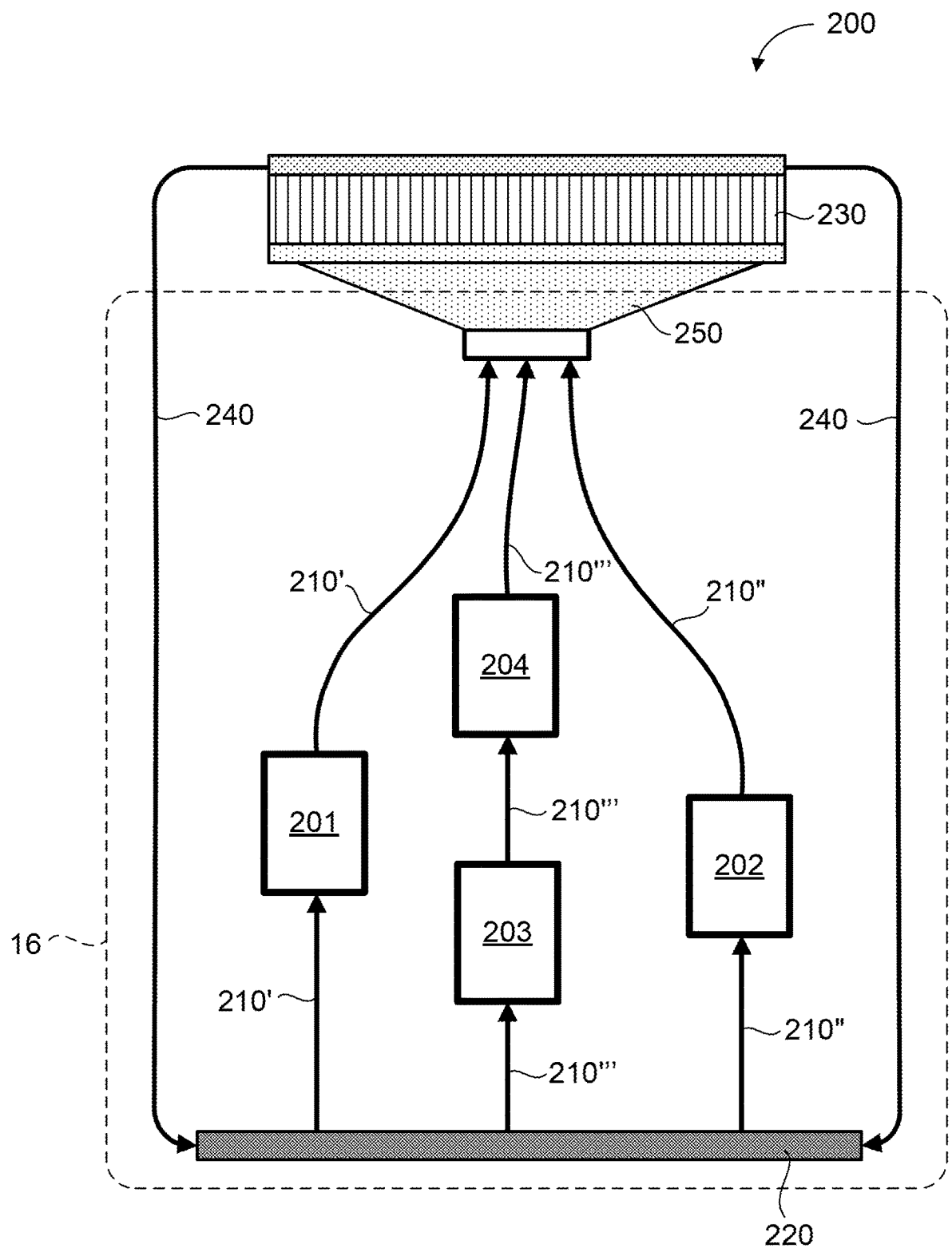
FIG. 2 illustrates a schematic view of a cooling system, according to an aspect of this disclosure.

FIG. 2 illustrates a schematic view of a cooling system 200, according to an aspect of this disclosure. Various components in the nacelle (or enclosure) 16 need to be cooled. These heat generating components include a transformer 201, converter 202, gearbox 203 or generator 204. The specific components shown are one example only, and nacelles may omit certain heat generating components or add others. For example, a direct drive wind turbine does not have a gearbox as the rotor is connected directly to the generator, so the gearbox would be omitted in this embodiment. As shown in FIG. 2, all the heat generating components 201-204 are located or housed within the enclosure 16.

Each heat generating component 201-204 is thermally connected to a first conduit 210, and the first conduit 210 is fluidly connected to a distribution manifold 220 and a condensing unit 230 which is located external to enclosure 16 and above the heat generating components 201-204. A second conduit 240 is fluidly connected to the condensing unit 230 and the distribution manifold 220. The conduits 210, 240 contain a two-phase cooling medium that turns gaseous and rises as it heats up by absorbing thermal energy from the heat generating components 201-204, and the cooling medium changes back to a liquid state as it cools in the condensing unit 230.

A first loop exists with first conduit 210', transformer 201, condensing unit 230, second conduit 240 and distribution manifold 220. A second loop exists with first conduit 210", converter 202, condensing unit 230, second conduit 240 and distribution manifold 220. A third loop exists with first conduit 210''', gearbox 203, generator 204, condensing unit 230, second conduit 240 and distribution manifold 220. The multiple first conduits 210', 210", 210''' form parallel flow paths between the distribution manifold and the condensing unit. Individual paths may have heat generating components connected in series, as shown with first conduit 210''' and gearbox 203 and generator 204. The cooling medium is in its liquid state in distribution manifold 220, and the distribution manifold is the lowest element in the system as gravity is used to collect and return the liquid cooling medium to the distribution manifold 220. Liquid cooling medium is also present in the lower portions of first conduits 210. As the wind turbine operates the heat generating components 201-204 generate heat and this heat is transferred to the cooling medium. The cooling medium will phase change to a gaseous state and naturally forms a thermosiphon as the gases rise up first conduits 210 towards condensing unit 230.

The condensing unit 230 is located external to the enclosure 16 (or nacelle) and is exposed to natural convective cooling by the wind. The gaseous cooling medium in condensing unit 230 cools down and phase changes back to its liquid state, which is denser than the gaseous state. This liquid cooling medium falls back down second conduit 240 towards the distribution manifold 220. The natural forces of convection are the driving force of circulation for the cooling medium. Hot vapor rises up to the condensing unit 230, and cooler liquid falls back down to the distribution manifold 220 via second conduits 240. No pump or fan is needed to circulate the cooling medium in cooling system 200. Hotter components also self-regulate the flow rate of cooling medium passing through the first conduit. A hotter component will evaporate more cooling medium than a cooler component, resulting in a higher cooling medium flow rate in hotter vs. cooler heat generating components. Cooling medium flow rate automatically adjusts based on the need of the individual heat generating component.

A vapor spreader 250 may also be interposed between and fluidly connected to the first conduits 210 and the condensing unit 230. The vapor spreader 250 is a diffuser that enables the gaseous cooling medium to expand and efficiently fill the condensing unit. The vapor spreader also reduces the pressure of the vapor and reduces its condensing temperature. The vapor spreader 250 may be housed within the enclosure 16, housed partly within and external to the enclosure 16, or entirely external to the enclosure. The vapor spreader 250 may be attached to the enclosure/nacelle 16 (as shown in FIG. 2) or the condensing unit may be attached to the enclosure/nacelle 16.

The two-phase cooling medium has a boiling point of about 60° C. or lower. The temperature range of the boiling point is chosen to sufficiently cool electronic components (e.g., transformers, converters, etc.), and prevent them from overheating. Coolants with higher boiling points (e.g., water with a boiling point of 100° C.) get too hot before they phase change to a gas, and result in over-temperature situations for electronic components. Examples of satisfactory cooling mediums are dodecafluoro-2-methylpentan-3-one (e.g., 3M™ Novec™ 649, trademarks of 3M), Novec™ 7000, or a fluid with a chemical composition of $CF_3CF_2C(O)CF(CF_3)_2$. Other less environmentally friendly alternatives could be 1,1,1,2-tetrafluoroethane, R-134a, 2,3,3,3-Tetrafluoropropene, or HFO-1234yf, however, these may not exist in a liquid state for the desired time period or in the desired temperature range.

Figure 3:
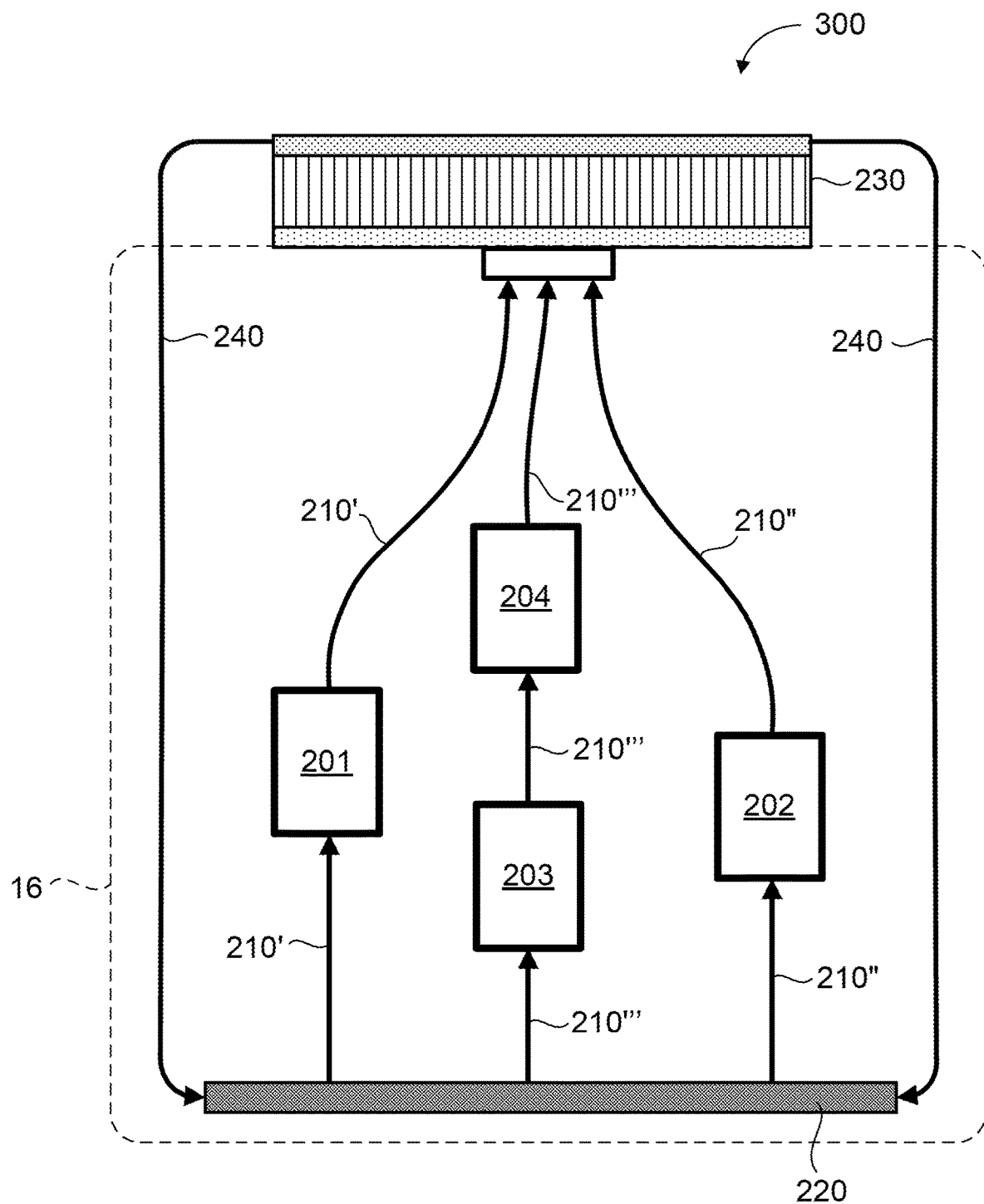
FIG. 3 illustrates a schematic view of a cooling system, according to an aspect of this disclosure.

FIG. 3 illustrates a schematic view of a cooling system 300, according to an aspect of this disclosure. The condensing unit 230 is attached to the enclosure or nacelle 16 and the vapor spreader (as shown in FIG. 2) is omitted. The first conduits 210 fluidly connect directly to the condensing unit 230. One advantage of this embodiment (and the embodiment shown in FIG. 2) is that the nacelle 16 may be sealed. External vents allowing air into the nacelle 16 are not required, and this could be a big advantage in sandy, dusty or salt-water environments. The sealed nacelle greatly reduces or eliminates contaminants from entering the interior of the nacelle, and this is very advantageous to the various components (i.e., the generator, transformer, converter, etc.) housed therein. Yet another advantage to the cooling systems 200, 300 is that the condensing unit 230 need only be higher than the upper portion of first conduits 210, to enable natural convective flow. This enables the condensing unit 230 to be attached directly to the top of the nacelle 16. Large or substantial height differentials between the condensing unit 230 and the heat generating components 201-204 are not required for the system to function properly. It can be very problematic to permanently elevate (e.g., on top of a pole) the condensing unit due to the substantial wind loads sustained at elevations above the nacelle. The condensing unit 230 is much more stable, secure and reliable when attached either directly to the nacelle or to the nacelle via vapor spreader 250. Orienting the condensing unit 230 normal to the wind flow removes the need for an electric fan. When the wind is blowing at a reduced rate, the associated heat load to dissipate will also be reduced.

Figure 4:
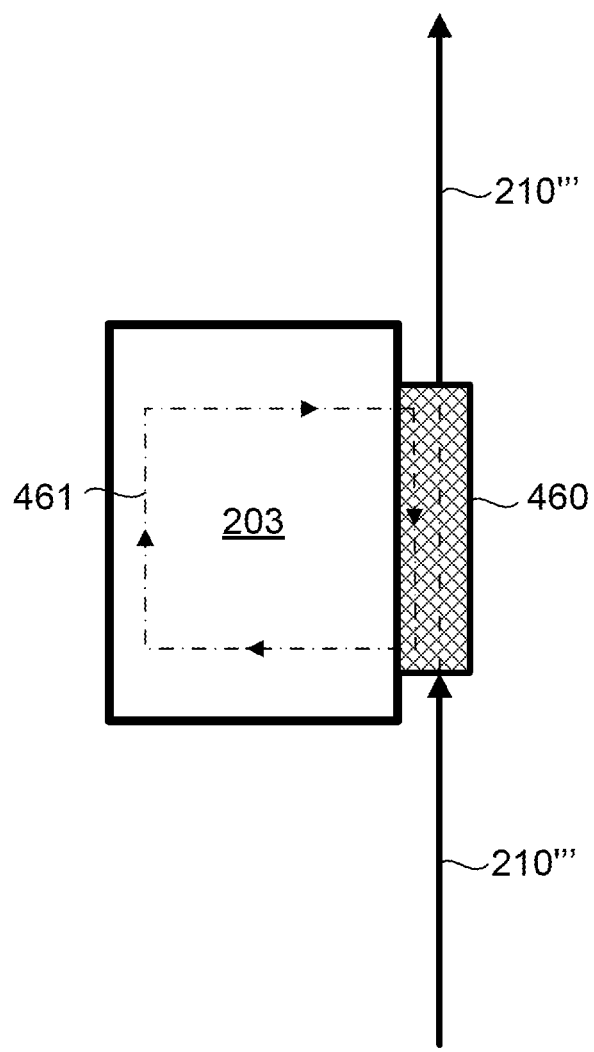
FIG. 4 is a schematic view of the first conduit and a heat exchanger thermally connected to heat generating component, according to an aspect of the present disclosure.

FIG. 4 is a schematic view of the first conduit 210 and a heat exchanger 460 thermally connected to heat generating component 203, according to an aspect of the present disclosure. The heat exchanger 460 may be a loop or spiral of first conduit 210 in thermal connection with component 203, or the heat exchanger may comprise separate cooling loop that circulate heat transfer mediums. For example, heat exchanger 460 may include a heat transfer loop 461 that passes in or around the component 203. The loop 461 may be configured in a counter-flow arrangement (as shown) with respect to first conduit 210, or a cross flow arrangement where heat transfer medium in loop 461 travels generally orthogonal to flow in first conduit 210. The loop 461 and conduit 210 may also be configured in a parallel-flow arrangement, where both flows travel in the same direction. The heat transfer medium in loop 461 may be air or fluid, or the heat transfer from component 203 to heat exchanger 460 may occur through a radiative or conductive effect. For example, a highly heat conductive material (e.g., copper or aluminum) can be attached to the component and the first conduit may be embedded within or attached to the highly heat conductive material. Additional heat exchangers 460 (and respective first conduits) may be thermally attached to each heat generating component desired to be cooled.

Figure 5:
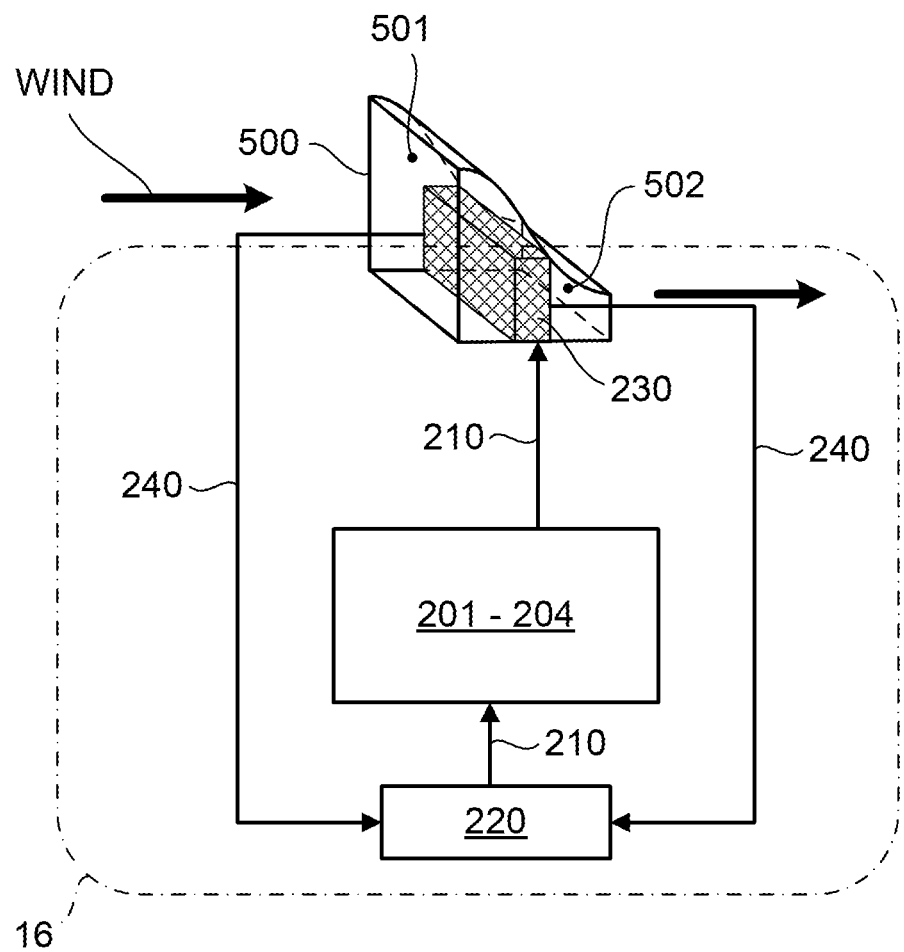
FIG. 5 is a schematic view of the cooling system incorporating a funnel or scoop on top of the nacelle to increase airflow velocity through the condensing unit, according to an aspect of the present disclosure.

FIG. 5 is a schematic view of the cooling system incorporating a funnel 500 (or scoop) on top of the nacelle 16 to increase airflow velocity through the condensing unit 230, according to an aspect of the present disclosure. The funnel 500 is attached to and located on the top of the enclosure/nacelle 16 and increases a speed of airflow through the condensing unit 230 when compared to airflow speed external to the enclosure/nacelle 16. The condensing unit 230 is located inside the funnel 500, and an inlet area of an inlet side 501 of the funnel 500 is greater than an outlet area of the outlet side 502. The inlet side 501 is upwind of the outlet side 502. Wind, or airflow, entering the inlet side 501 will increase in velocity as it travels axially (and downstream) along the funnel 500, and eventually this airflow exits through outlet side 502. Simply put, the funnel 500 (e.g., a hood) catches more wind, and then funnels this wind over/through the condensing unit 230. This increases the air velocity over the condensing unit 230 and permits a reduction in the size of the condensing unit, compared to applications that do not use a funnel 500. Additionally, the funnel 500 allows for reduction of the internal pressure in the cooling system by reducing the condensing unit temperature. Airflow through the funnel 500 does not enter the nacelle 16, but rather passes along or near the top of the nacelle.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A passive cooling system comprising:
a first conduit configured to be thermally connected to one or more heat generating components located within an enclosure, the first conduit fluidly connected to a distribution manifold and a condensing unit, the condensing unit positioned external to the enclosure and above the one or more heat generating components, the distribution manifold positioned below the heat generating components;
a second conduit fluidly connected to the condensing unit and the distribution manifold so as to establish a closed loop comprising the first conduit, the condensing unit, the distribution manifold, and the second conduit, the closed loop being absent of a pump; and
a cooling medium contained within the closed loop and circulating through the closed loop via convection.

2. The passive cooling system of claim 1, wherein the enclosure is a nacelle of a wind turbine.

3. The passive cooling system of claim 2, wherein the nacelle is a sealed nacelle.

4. The passive cooling system of claim 1, wherein the one or more heat generating components include a hermetically sealed motor.

5. The passive cooling system of claim 1, further comprising a plurality of first conduits connected in parallel between the distribution manifold and the condensing unit.

6. The passive cooling system of claim 1, wherein two or more heat generating components are thermally connected in series along the first conduit.

7. The passive cooling system of claim 1, further comprising:
a vapor spreader interposed between and fluidly connected to the first conduit and the condensing unit, wherein the vapor spreader reduces the pressure and condensing temperature of the cooling medium.

8. The passive cooling system of claim 1, wherein the cooling medium comprises a fluid with a chemical composition of $CF_3CF_2C(O)CF(CF_3)_2$.

9. The passive cooling system of claim 1, further comprising:
a funnel located on a top of the enclosure, the condensing unit positioned inside the funnel, wherein an inlet area of the funnel is greater than an outlet area of the funnel, thereby increasing a speed of airflow over the condensing unit when compared to airflow speed external to the enclosure.

10. The passive cooling system of claim 1, further comprising:
at least one heat exchanger thermally connected to the first conduit and configured to be thermally connected to at least one of the one or more heat generating components, wherein the heat exchanger comprises a heat transfer loop oriented to pass in or around a corresponding heat generating component; and
a heat transfer medium contained within the heat transfer loop.

11. The passive cooling system of claim 10, wherein the heat transfer loop is oriented orthogonally to the first conduit.

12. The passive cooling system of claim 1, wherein the condensing unit is oriented perpendicular to a non-fan-driven wind flow, wherein the non-fan-driven wind flow convectively cools the condensing unit.

13. A wind turbine comprising:
a tower secured atop a support surface;
a nacelle mounted atop the tower;
a rotor mounted to the nacelle;
one or more heat generating components positioned within the wind turbine; and
a passive cooling system oriented to remove a portion of heat generated by the one or more heat generating components from within the wind turbine, the passive cooling system comprising:
a first conduit thermally connected to at least one of the heat generating components, the first conduit fluidly connected to a distribution manifold and a condensing unit, the condensing unit positioned external to the wind turbine and above the heat generating components, the distribution manifold positioned below the heat generating components,
a second conduit fluidly connected to the condensing unit and the distribution manifold so as to establish a closed loop comprising the first conduit, the condensing unit, distribution manifold, and the second conduit, the closed loop being absent of a pump, and
a cooling medium contained within the closed loop and circulating through the closed loop via convection.

14. The wind turbine of claim 13, further comprising a plurality of first conduits connected in parallel between the distribution manifold and the condensing unit.

15. The wind turbine of claim 13, wherein the passive cooling system further comprises:
a vapor spreader interposed between and fluidly connected to at least one first conduit and the condensing unit, wherein the vapor spreader reduces the pressure and condensing temperature of the cooling medium.

16. The wind turbine of claim 13, wherein the condensing unit is attached to the nacelle and oriented perpendicular to a non-fan-driven wind flow, wherein the non-fan-driven wind flow cools the condensing unit.

17. The wind turbine of claim 16, further comprising:
a funnel located on a top of the nacelle, the condensing unit located inside the funnel, wherein an inlet area of the funnel is greater than an outlet area of the funnel, thereby increasing a speed of airflow over the condensing unit when compared to airflow speed external to the nacelle.

18. The wind turbine of claim 13, wherein the cooling medium comprises a fluid with a chemical composition of $CF_3CF_2C(O)CF(CF_3)_2$.

19. The wind turbine of claim 13, wherein the passive cooling system further comprises:
at least one heat exchanger thermally connected to the first conduit and at least one of the heat generating components, wherein the heat exchanger comprises a heat transfer loop oriented to pass in or around the heat generating component, and
a heat transfer medium contained within the heat transfer loop.

20. The wind turbine of claim 19, wherein the heat transfer loop is configured in a counter-flow arrangement with respect to the first conduit.

* * * * *